Nov. 21, 1950     S. LENNER     2,531,224
AUTOMATIC MACHINE FOR MACARONI
Filed Dec. 19, 1946
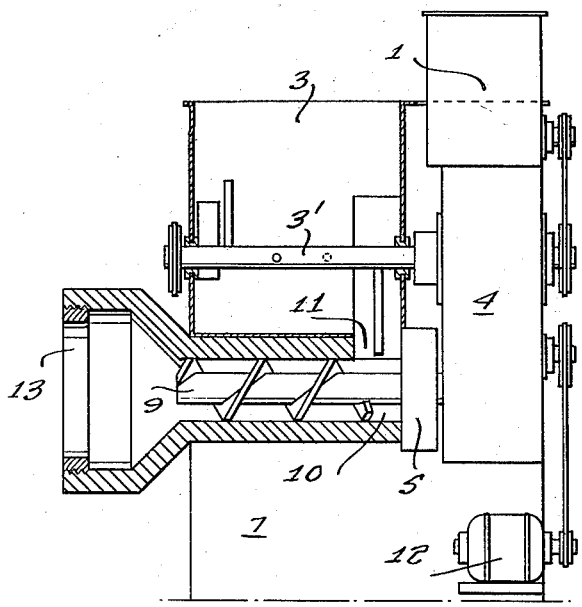
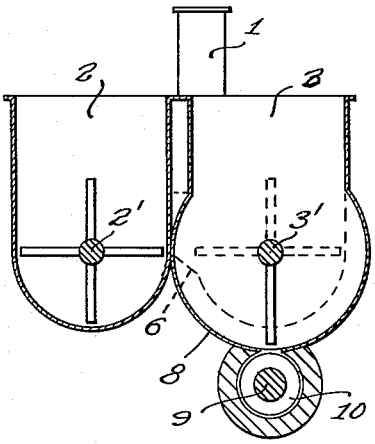
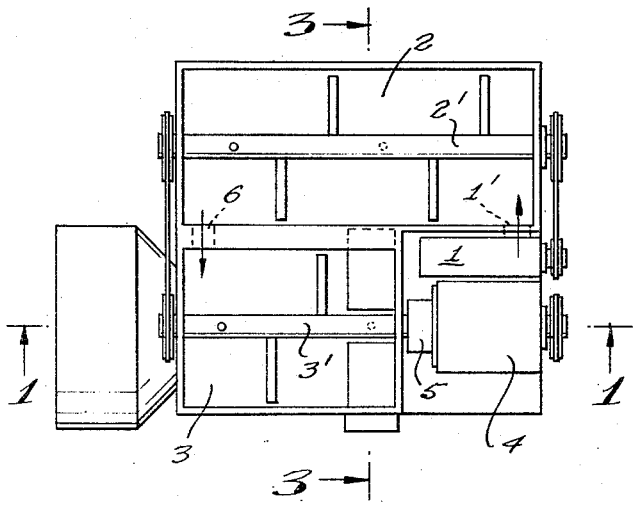
INVENTOR.
SANDRO LENNER
BY

UNITED STATES PATENT OFFICE 2,531,224

AUTOMATIC MACHINE FOR MACARONI

Sandro Lenner, Milan, Italy

Application December 19, 1946, Serial No. 717,301
In Italy May 9, 1946

2 Claims. (Cl. 107—14)

This invention relates to machines for handling alimentary pastes such as macaroni paste and dough, and particularly to an automatic macaroni machine.

Automatic machines for manufacturing alimentary pastes and doughs which are on the market at present are almost always provided with one or more feeding or pressing screws placed beneath the mixing trough from which the paste or dough is pressed to conveyor screws through a passage conduit which is so arranged and of such nature that it does not allow an even downward feed or flow of the dough.

However, the mentioned automatic machines have an excessive length, due to the length of the mixer and because the driving means are placed outside the mixing troughs. It should be added that in such conventional machines, dough from the kneading trough flows down to the conveyor screws without having actually been kneaded so that the product is only partially and thus unsatisfactorily worked.

These drawbacks have been avoided by the machine embodying the present invention, since the conventional conduit between the mixing trough and the feeding and pressing screw has been eliminated, two mixers have been arranged in adjacent side by side relation, one being shorter than the other, which provides a space beyond the shorter mixing trough for placing the driving means within the longitudinal dimension of the longer mixing trough, while means has been provided for kneading the paste by including a kneading space within the casing of the feeding or pressing screws. A reduction of the overall dimensions and of the space required for the machine has thus also been obtained.

In order to obtain an even flow of the paste from the mixing trough to the feeding and pressing screw casing, the mixer blades in correspondence with the passage between the two mixing spaces rotate through a circle which is tangent to the cylinder described by the rotating screw. For this purpose, the mixing trough is suitably enlarged accordingly at that point.

The present invention is illustrated by way of non-limitative example in the accompanying drawing, wherein:

Fig. 1 shows the sectional view of a machine through the vertical plane containing the axis of the screw on line I—I in Fig. 2;

Fig. 2 is a plan view of the same machine; and

Fig. 3 is a vertical cross-section taken on line 3—3 in Fig. 2.

The machine primarily consists of a hopper I or the like serving as a preliminary mixing or dosing device, for delivering flour and water to a mixer 2 having rotating blades driven by a mixer shaft 2' and feeding the stuff to the mixer 3 which is also provided with rotating blades driven in turn by mixer shaft 3' of the shorter mixer 3 adjacent thereto and driven by a reduction gearing indicated at 4. Device I communicates through passage I' with mixing trough 2 while this trough communicates through passage 6 with mixer 3.

The mixer 3, in the charging zone where the feeding and pressing screw 9 is supplied with mixed dough, has an enlarged portion 8 which allows the rotating blades to pass close to this feed screw 9. The latter screw is driven by the reduction gearing 4 and is supported by thrust bearings placed in 5 and furthermore has a section 10 free from the worm which serves as a kneading chamber. On the other hand the whole assembly is supported by and connected to a frame 7, and the mixer driven by a motor 12.

The operation of the machine is as follows:

Water and flour from the hopper or dosing device I flow down into the first mixer trough 2 and are treated by the blades on mixer shaft 2' and moving along the trough to the aperture or passage 6 through which they pass into the mixing trough 3, moving towards the enlarged zone 8 where the resulting dough mixture descends through the passage II into the first part of the screw or kneading chamber 10.

The product coming from the mixers is gathered in the mentioned chamber at the point where the worm is missing, forming a compact kneaded paste or dough which is forced along by screw 9 and fed through the die 13 by the same screw which following the zone 10 serves as a pressing screw.

Manifestly, variations may be resorted to and parts and features may be modified or used without others within the scope of the appended claims.

Having now particularly described and ascertained the nature of my said invention and in what manner the same is to be performed, I declare that what I claim is:

1. A machine for working pasty material comprising a screw press the casing of which is provided with an upper feeding port and a mixing trough containing a shaft rotatably mounted therein and bearing radial paddle blades, said trough being superposed to said casing and provided with an outlet aperture coinciding with said feeding port, in correspondence to said aperture said trough being of enlarged cross section and said paddle blades being tangent in their rotation to the screw of said screw press.

2. A machine for working pasty material comprising a screw press the casing of which is provided with an upper feeding port and a mixing trough containing a shaft rotatably mounted therein and bearing radial paddle blades, said trough being superposed to said casing and provided with an outlet aperture coinciding with said feeding port, in correspondence to said aperture said trough being of enlarged cross section and said paddle blades being tangent in their rotation to the screw of said screw press, a second mixing trough adjacent to the first mentioned trough having a length greater than the latter and communicating therewith through a passageway.

SANDRO LENNER.

REFERENCES CITED

The following references are of record in the file of this patent:

UNITED STATES PATENTS

| Number | Name | Date |
|---|---|---|
| 90,509 | Davidson | May 25, 1869 |
| 826,442 | Orr | July 17, 1906 |
| 1,831,779 | MacDonald | Nov. 10, 1931 |
| 2,441,222 | Fuller | May 11, 1948 |

FOREIGN PATENTS

| Number | Country | Date |
|---|---|---|
| 448,769 | Great Britain | Mar. 12, 1935 |
| 581,625 | Germany | July 31, 1933 |